UNITED STATES PATENT OFFICE.

WILLIAM ANTHONY PARKER, OF PENHOOK, VIRGINIA.

PROCESS OF FLAVORING TOBACCO.

1,219,856.  Specification of Letters Patent.  Patented Mar. 20, 1917.

No Drawing.  Application filed August 25, 1915.  Serial No. 47,217.

*To all whom it may concern:*

Be it known that I, WILLIAM A. PARKER, a citizen of the United States, and a resident of Penhook, in the county of Franklin and State of Virginia, have invented a new and Improved Process of Flavoring Tobacco, of which the following is a full, clear, and exact description.

This invention relates to the production of tobacco, and has for its principal object to improve the process of preparing tobacco for consumption without the necessity of any manufacturing process after the tobacco leaf is cured, this advantage being attained by applying the sweetening or flavoring material to the leaf of the standing plant or while the leaf is in a natural state and growing. The sweetening or flavoring material may be any desired substance suitable for the purpose, and when applied in a liquid or powdered form adheres to or seems to penetrate into the leaf, so that all that remains to prepare the tobacco for use after the harvesting operation, is to cure it, the sweetening or flavoring being a permanent quality of the cured leaf. Besides doing away with the usual process of sweetening or flavoring the leaf after the tobacco is harvested, this improved process is economical, in that the sweetening or flavoring can be easily and quickly accomplished, since it is sprinkled, dusted or sprayed on the plants with the leaves naturally in the best position to receive the sweetening or flavoring material.

In carrying out the process a sweetening or flavoring solution is first made, which may be licorice dissolved in water, or the solution may consist of molasses, sugar, honey, or any other saccharine substance, glycerin or glucose, and include any flavorings of wines, liquors, extracts of fruits, or powdered fruits, vanilla, chocolate, or any of the aromatic flavorings. After the sweetening or flavoring solution is spread or sprinkled on the leaves, the solution dries in about five hours under the action of the sun, leaving a glossy appearance on the surface of the leaf, which is not attacked by insects or worms. When the plants are harvested this substance remains as a permanent sweetening or flavoring. If powdered sweetening or flavoring material is used the same adheres, due to the natural stickiness of the leaf. After the leaves are cured they are ready for immediate consumption without any further flavoring or sweetening.

Having thus described my invention, I claim as new and desire to secure by Letters Patent:

The process of sweetening or flavoring tobacco, which consists in spraying a sweetening fluid on the leaves of the growing plant, and allowing the liquid to penetrate into the leaves while subjected to the sun's rays.

In testimony whereof I have signed my name to this specification in the presence of two subscribing witnesses.

WILLIAM ANTHONY PARKER.

Witnesses:
F. K. SAUNDERS,
S. M. BREAZEAL.